Figure 5:
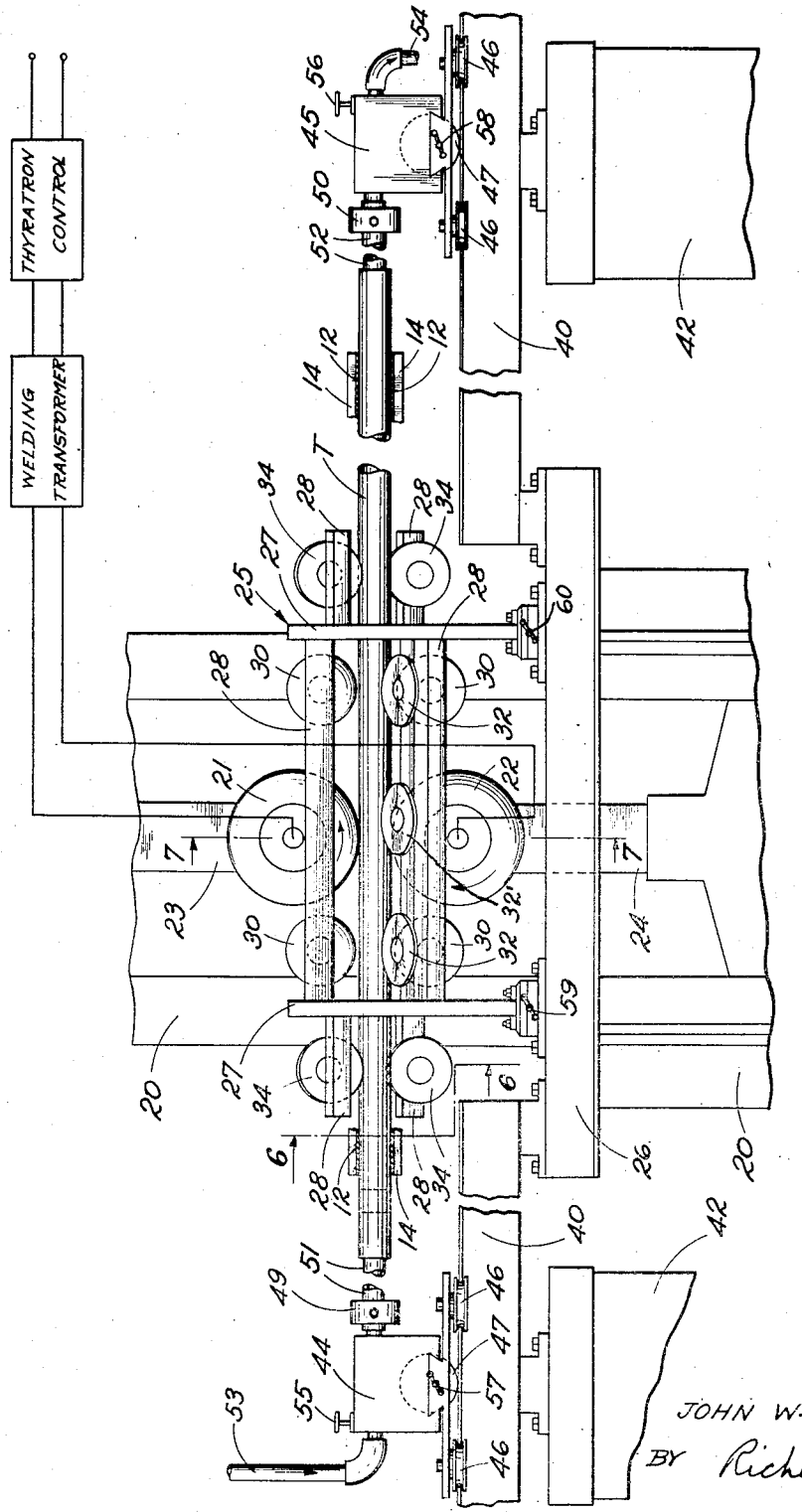

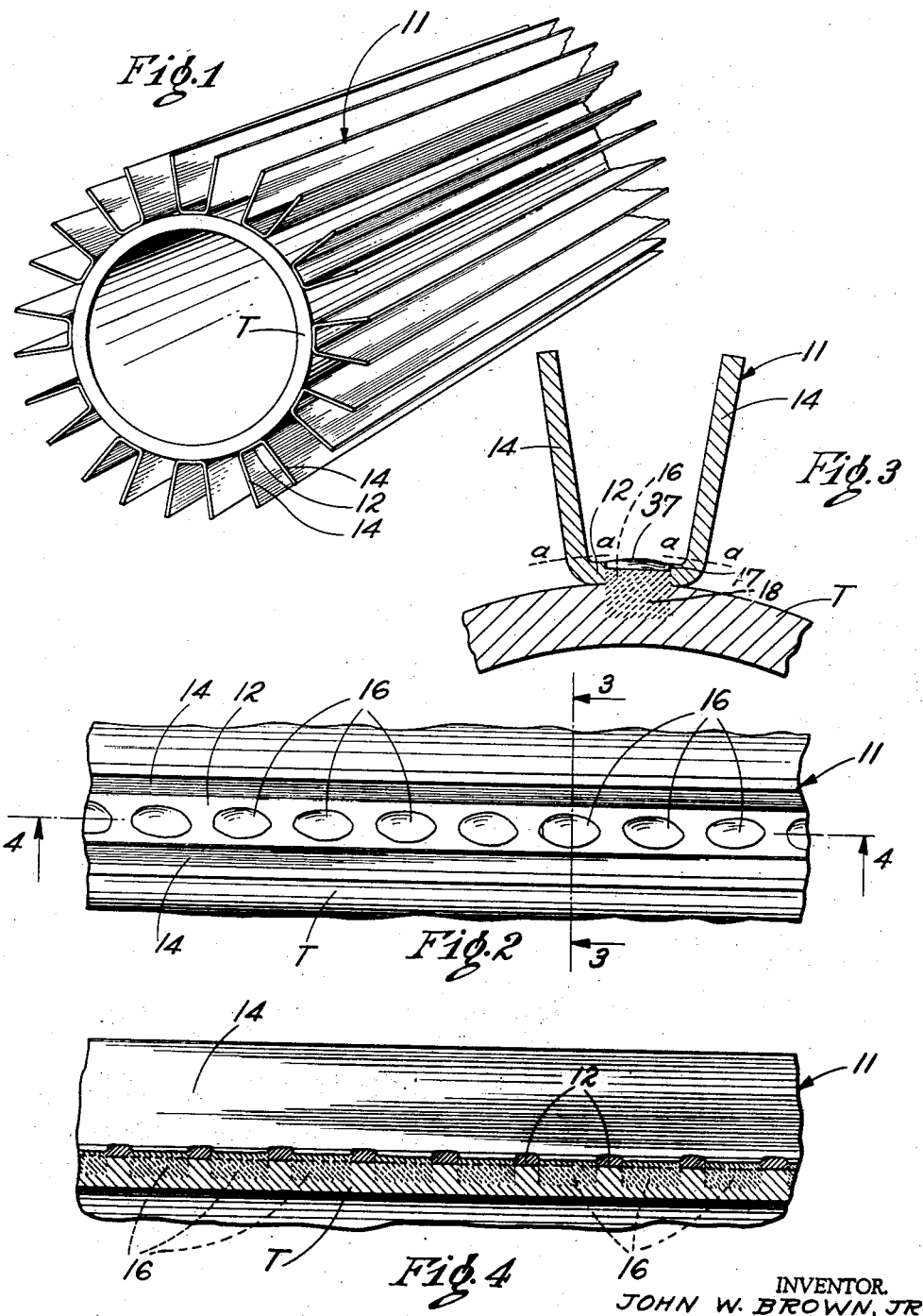

Oct. 6, 1942.  J. W. BROWN, JR  2,298,249
APPARATUS FOR MAKING FINNED TUBES
Filed March 12, 1940   3 Sheets-Sheet 3
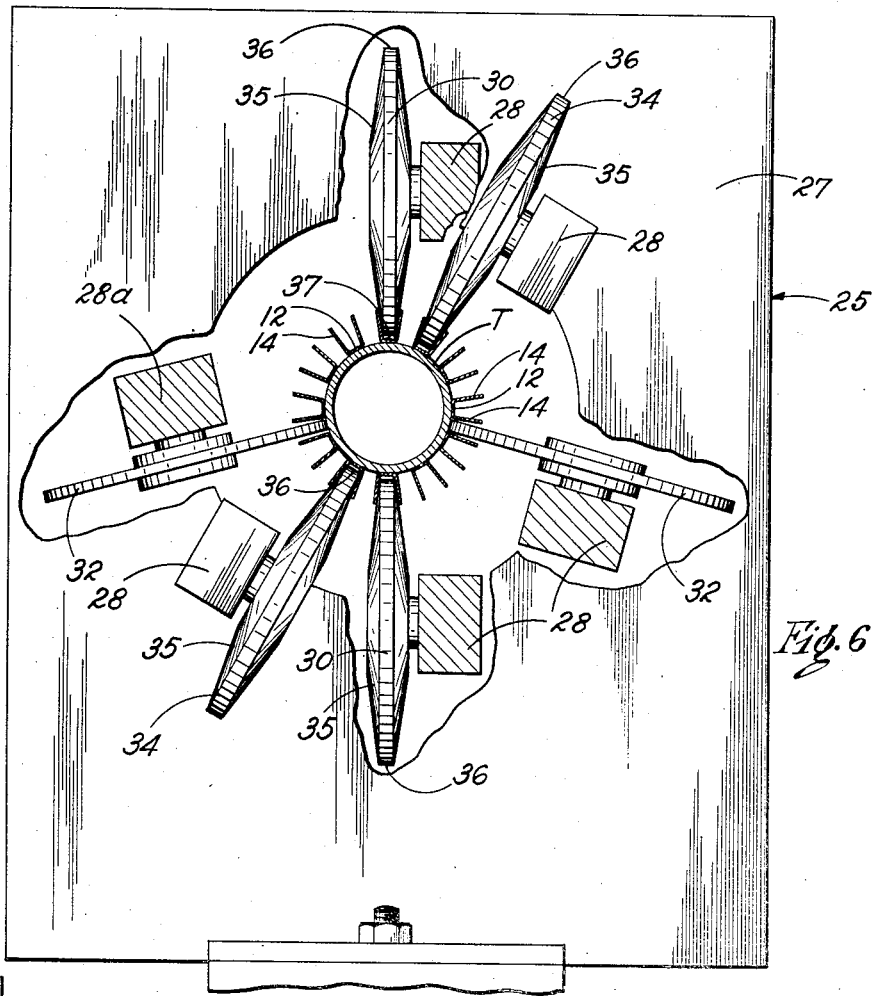
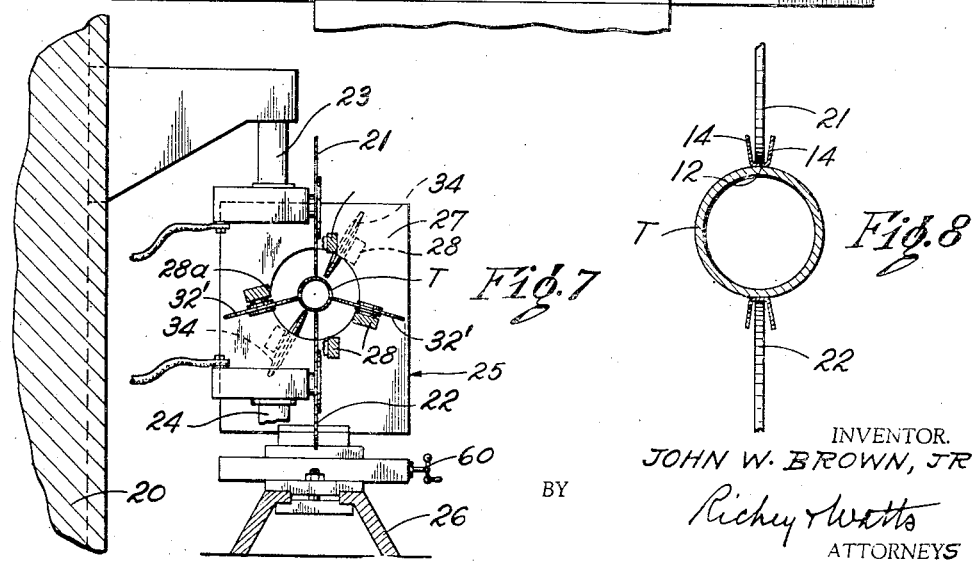
INVENTOR.
JOHN W. BROWN, JR
BY Richey Watts
ATTORNEYS Patented Oct. 6, 1942

2,298,249

UNITED STATES PATENT OFFICE 2,298,249

APPARATUS FOR MAKING FINNED TUBES

John W. Brown, Jr., Lakewood, Ohio, assignor to Brown Fintube Company, Elyria, Ohio, a corporation of Ohio Application March 12, 1940, Serial No. 323,593

12 Claims. (Cl. 219—4)

This invention relates to apparatus for attaching metallic fin members to the exterior of metal tubes for producing finned tubes adapted particularly for use as heat exchange conduits, although the tubes are also useful as structural members.

In the manfacture of heat exchangers it is desirable to augment the area of the fluid conducting tubes employed by securing fins of various types to the exterior of the tubes. Fins extending longitudinally of the tubes are particularly desirable in some types of installations because of the desirable flow characteristics which can be obtained in the fluid surrounding the tube. Various methods have been proposed for securing such fins to the exterior of tubes but so far as I am aware, all prior methods have been open to serious objections in that they were expensive and did not connect the fins to the tubes in such manner that full advantage could be taken of the heat transferring capacity of the fins, that is, in prior types of finned tubes the transfer of heat from the tube to the fins has been inefficient.

It is accordingly among the objects of my invention to provide an apparatus adapted to attach fins to tubes which will produce finned tubes wherein an adequate path is provided for the flow of heat from the tube to the fins. Another object is to provide an apparatus whereby such tubes can be rapidly and efficiently carried out. Another object is to provide an apparatus adapted to hold fins accurately in proper relationship to a tube during a welding operation. Another object is to provide such an apparatus which is simple and sturdy, and which will function to produce straight and accurate finned tubes. Further and more specific objects of my invention will become apparent from the following description of a preferred form thereof, reference being made to the accompanying drawings. The essential characteristics are summarized in the claims.

Briefly, my invention contemplates the production of finned tubes of the type in which each fin member comprises a fin proper and a base portion welded to the tube, for example, each fin member may be of sheet metal preformed to either a U-shaped or an L-shaped cross-section with the base of the U or L, as the case may be, welded to the exterior of the tube. Preferably the bases of two oppositely disposed fin members are welded simultaneously to the tube by electric resistance welding to produce substantially identical rows of welded areas, the welds preferably being evenly spaced in such a manner that the welded area between the bases of the fin members and the tube is such that the rate of heat transfer from the tube into the base of the fin member will be at least substantially as great as the rate of heat transfer from the base of the fin member to the fins themselves.

Preferably the welding operation is carried out with opposite pairs of welds made by the use of two electrodes pressed against the bases of two oppositely disposed fin members, with the current flowing through the tube from the weld in one fin base to that in the other fin base. The operation is carried out so that the heating and the corresponding expansion of the tube is equal along the opposite sides of the tube so that the tubes will not be warped or curved during the welding operation. The invention is described herein in conjunction with the simultaneous welding of a pair of fin members, but it is to be understood that, with the proper apparatus, more than two fin members may be simultaneously welded to the tube, if desired, in which case the fin members are preferably spaced equally circumferentially so that with substantially equal heating there will be no bowing of the tube. Further, the successive welds are made so rapidly, with such a short time interval between successive welds, that the tube is progressed between the welding electrodes faster than heat is conducted longitudinally of the tube to an extent to materially soften the base portions of the finned members or the tube itself in the region engaged by the electrodes. By this method the electrodes, which must exert considerable pressure in order to make proper welds, engage metal which is still relatively cool and has not been unduly weakened by heat. This prevents the damaging of the bases of the finned members and distortion of the tube which would occur if the welding operations and the relative movement of the tube and electrodes were carried out at such slow speeds that the heat generated in the making of one pair of welds had time to travel ahead to soften the tube and fin members in the areas next to be welded before the welding pressure and heat are applied thereto. By my method, the tube is not materially weakened by the heat at the time the welding pressure is applied, thus the tube not only has strength to resist distortion, but also to resist the welding pressure and thus make possible the production of successful welds. This necessitates, of course, control of the welding current, pressure and speed, and the use of a high amperage current so as to reduce the time required for each pair of opposed welds.

In order to carry out my method efficiently and rapidly, I preferably employ a welding machine of the continuous type, embodying electrode rolls engaging the bases of finned members on opposite sides of the tube and provided with means for governing the intensity of the welding current and also means such as the well-known "thyratron" control, for accurately governing the time and duration of flow of current. In conjunction with the machine, which, per se, forms no part of the present invention, and which may be of any well-known construction, I provide a jig or fixture for supporting and guiding a tube and fin members in their passage through the machine, the jig preferably being arranged to permit rapid and accurate indexing of the tube, and being provided with means for supporting the ends of the tube to prevent sagging and for supplying a cooling fluid to the tube if desired.

Referring now to the drawings, Figure 1 is a perspective view illustrating a section of finned tube made according to my invention; Fig. 2 is a fragmentary plan view on an enlarged scale, illustrating one of the finned members secured to the tube; Figs. 3 and 4 are fragmentary sections through the tube as indicated by the lines 3—3 and 4—4 respectively on Fig. 2; Fig. 5 is an elevation showing a portion of a welding machine adapted to carry out my method and provided with my apparatus for supporting and guiding the tube and fins through the machine; Fig. 6 is a section on an enlarged scale taken along the line 6—6 of Fig. 5 showing the engagement between the various guide rollers and tube and fins. Fig. 7 is a section taken along the line 7—7 of Fig. 5 with the fins broken away for convenience of illustration, and Fig. 8 is a fragmentary section, on an enlarged scale, showing the engagement between the electrode rolls and fins.

As shown in Fig. 1 of the drawings, a finned tube made according to a preferred form of my invention may comprise a tubular member T to which a number of fin members 11 are secured. Each fin member is preferably of a channel section as shown in Fig. 3 and may comprise a base portion 12 and fins 14 formed integrally therewith, the base and fins being of substantially the same thickness.

It will be evident to those skilled in the art that the transfer of heat from the tube T to the fins 14 must take place through the base portion 12. Further, the limiting factor in the flow of heat from the base portion 12 to the fins 14 is found in the longitudinal sectional area of the fins adjacent the base in the regions indicated at $a$—$a$ in Fig. 3. Per unit of length, this area is of course proportional to the thickness of these sections.

It follows, then, that if full advantage is to be taken of the heat transferring capacity of the fins 14, the path or paths for the flow of heat from the tube T to the base 12 must be at least equal in area to the combined areas of the fins 14 in the regions $a$—$a$. To accomplish this result I secure the channel members 11 to the tube by a series of resistance welds indicated diagrammatically at 16 and having a combined area per unit of length at least substantially equal to the longitudinal sectional area of the fins 14 at the junctures between the fins and the base portion 12.

The desired area can be readily secured by a series of resistance welds spaced as shown in the drawing and any increase in area is of no advantage for, in any event, the transfer of heat to the fins 14 will be limited to the conductive capacity of the portions $a$—$a$ of the fins. A further advantage in securing the fins to the tube in spaced welds is found in the fact that if the tube is subjected to a sudden heat shock in service the fins can buckle or stretch in the regions between welds without subjecting the tube itself to unduly large forces, whereas if the fins were welded continuously to the tube such an action would not be possible and a heat shock might have the effect of damaging the tube.

A further and important advantage of utilizing spaced welds rather than a continuous line weld will be apparent from a consideration of Figs. 2, 3 and 4. As shown in a somewhat exaggerated fashion in Figs. 3 and 4 the production of the weld between the base portion 12 and the tube T results in a thinning of the base portion in the region of the weld, the amount which the metal has been thinned being indicated at 17. While the cross-sectional area of the weld 16 taken on a plane tangent to the tube in the region of the weld will be adequate to insure proper conduction and flow of heat, nevertheless if the weld were a line weld instead of a series of spot welds, then the cross-sectional area between the weld portion and the remainder of the base portion would be reduced to a value less than the area of the fins 14 in the regions $a$—$a$. The reason for this is that the thickness of the base is reduced in the zone 18 to a thickness less than the thickness in the regions $a$—$a$, whereas with a line weld the lengths will be equal. Thus, with a line weld, even though the area of the weld itself would probably be adequate to insure proper conduction of heat from the tube to that portion of the base incorporating the weld, nevertheless the area in a plane transverse to the axis of the weld would be insufficient and would limit the effective heat transfer to the fins 14.

This difficulty is overcome by my arrangement wherein the fins are secured to the tube by a series of equally spaced resistance welds. As shown in Fig. 2, by utilizing a series of resistance welds rather than a line weld, the limiting cross-sectional area becomes the area of the minute cylinders or disks which constitute projections of the welded areas through the base. The axial length of each of the cylinders is the distance at 18 between the bottom of the base of the fin and the top of the welded area 16, while the periphery of each is substantially the same as the periphery of the adjacent welded area 16. The combined peripheral length of the welded areas and, correspondingly, of the cylinders in the arrangement shown in Fig. 2 is considerably greater than the length of the section of tubing illustrated. Thus the increased length more than offsets the decrease in section due to the welding operation and there is no loss in efficiency of heat transfer at this point. For example, in a one inch length of tube with a channel section fin member having a thickness of 0.031 inch, the cross-sectional area at the base of the fins will be 0.062 square inch. If the welding operation is carried out in such a manner as to produce about three uniformly spaced welds to the inch with each welded area being of slightly oval form, about ¼ inch long and 9/64 inch wide, the periphery of each spot will be about ¾". With three such spots to the inch, and the thickness of the metal in the region of the welds being reduced to 0.028 inch the limiting area for the transfer of heat from the welded areas to the remainder of the base of the tube will be $3 \times \frac{3}{4} \times 0.028 = 0.063$ square inch.

As an example of a procedure which I have found to be satisfactory in welding low carbon steel channel section fins of a thickness of about .031″, to a low carbon steel twelve-gage tube having an outside diameter of 2″, with the welded area substantially as described above, I engage the bases of the channel members with electrodes having a width of about $\frac{9}{64}$ inch with an electrode pressure of 900 to 1,000 pounds. The current employed is preferably about 12,000 amps. at 6-8 volts. Each weld is made with a duration of current of 3 cycles of 60-cycle, single phase, alternating current, the current being shut off for a period of 3 cycles between welds, the fins being welded to the tube at a speed of 18 to 20 feet per minute, this speed being amply sufficient to prevent the tube from being deformed by the pressure of the electrodes.

As described above, with this procedure the total welded area between the bases of the fins and the tube is sufficient to give an ample path for conduction of heat to the bases and the periphery of the welded areas in the bases is such that there is an ample path for the flow of heat from the region of the welds into the adjacent areas of the bases.

As another example of a procedure which gives satisfactory results, fins composed of stainless steel containing 4% to 6% of chromium and having a thickness of .031″ may be welded to a twelve-gage tube composed of the same material with a current of about 9600 amperes, the control being arranged to have the current flow to produce the welds for a period of 2 cycles, the current being shut off for a like period between welds. An electrode pressure of 900 to 1,000 pounds is employed with electrodes $\frac{9}{64}$″ wide, the operation being carried on at a speed of from 12 feet to 14 feet per minute. This procedure gives about seven welds to the inch, the welds over-lapping slightly. As those skilled in the art will appreciate, the speed, pressure, current and timing may be varied to give the desired results with different materials, sizes and conditions of operation. The procedures outlined are, of course, given merely by way of example.

By carrying out the welding operations as described above and by maintaining the conditions on both sides of the tube as identical as possible, the heating effects on both sides of the tube are so nearly alike that the tube is not warped or bent by the welding operation. Preferably, alternating current is employed in making the welds and the timing is arranged so that the current flows for a whole number of cycles in making each weld, for by so doing the heating effects in both of the simultaneously produced welds will be identical, and leakage through the jig and the frame of the machine will not cause unequal heating and bowing of the tube. If direct current is employed, or if the duration of the welds includes fractional parts of cycles, for example two and one-half cycles of current flow per weld, then the direction of flow of current should be reversed between each welding operation. This reversal of the polarity of the electrodes prevents leakage of current to ground through the jig and frame of the machine from causing unequal heating effects on opposite sides of the tube. If desired, a cooling fluid such as water may be passed through the interior of the tube in order to further cool the same but this operation is not essential. The cooling fluid may be maintained under pressure to act a core within the tube, but for ordinary sizes and gages of tube I do not find this to be essential. Further, the electrodes may be cooled if desired, but in that event, care should be exercised to see that the cooling effect is the same on both electrodes.

In Figs. 5 to 8 I have illustrated an apparatus adapted to carry out my method. As shown particularly in Fig. 5 the apparatus may include a conventional welding machine, only a portion of the frame 20 of the machine being illustrated in the drawing. The welding machine includes electrode rolls 21 and 22 suitably driven and supported in brackets 23 and 24, provided with means such as air operated plungers (not shown) for urging the electrodes towards each other. In order to guide the tube and fins through the machine I employ the jig indicated generally at 25 and supported by the frame member 26 mounted on the welding machine. The jig comprises a frame consisting of plates 27 and a plurality of longitudinal members 28 and preferably welded to the plates to form a rigid structure. The frame members may be constructed of any suitable metals, most of the members preferably being composed of steel. However, members such as the longitudinal member 28a which passes between the leads for the electrodes should be made of a non-magnetic material such as bronze or copper, for the operation of the machine will, under some circumstances, cause a magnetic material used in this environment to become heated and to expand to a sufficient extent to throw the jig out of alignment and prevent proper operation of the machine. A plurality of rollers are mounted upon suitable bearings carried by the longitudinal members 28 and arranged to guide the tube and the fins through the machine and to provide for convenient indexing of the tube for welding of a plurality of fins thereto.

To guide the fins and position them properly for the welding operation two pairs of fin alignment rolls indicated at 30 are provided, one pair being on one side of the welding rolls 21 and 22 and the other pair being disposed on the other side of the welding rolls. As shown in Fig. 6 these alignment rolls are adapted to engage within the channel section fin members to retain them in position and in alignment with the electrodes 21 and 22.

To retain the tube in position and accurately centered with respect to the electrodes, and thereby to insure that the welds will be diametrically opposite each other, three pairs of tube centering rolls 32 and 32′ are employed. The rolls 32 may be conveniently disposed adjacent the fin alignment rolls 30 while the rolls 32′ are preferably placed as close as possible to the zone of contact between the electrodes and the tube. These rolls, as shown in Fig. 6, preferably are arranged to engage directly against the wall of the tube between the fin members. This arrangement is advantageous as it eliminates the need to provide for adjustment of the rolls which would be necessary if they were positioned to engage in zones to which fins were to be welded, for in such a case, the rolls would first engage directly against the tube, then, after fins had been welded thereto, would engage the bases of oppositely disposed finned members, necessitating adjustment to compensate for the thickness of the bases, and resulting in the rolls engaging the roughened welded areas of the bases. It will be obvious that with different arrangements or sizes of fins the position of the tube centering rolls may have to be changed in order that the rolls will always engage the tube rather than coming in engagement with the fin members.

In order to accurately space the fins upon the tube two pairs of indexing rolls 34 are preferably employed. As will be seen in Fig. 6 these rolls are angularly spaced from the alignment rolls 30 by an amount equal to the angle between adjacent pairs of fin members.

The engagement between the electrode rolls and fins is illustrated in Fig. 8 from which will be seen that the narrow electrode rolls fit down into the channel members and engage the bases of oppositely disposed channel members. Thus when the current is caused to flow, welds will be formed in the contacting zones of the channel members and tube, the current flowing around the circumference of the tube and the two welds being made simultaneously. As distinguished from the electrode rolls, which must necessarily engage the base portions of the fin members, the alignment rolls 30 and indexing rolls 34 do not engage the base portions of the finned members but, as indicated in Fig. 6, the conical sides 35 of the rolls engage the flanges or fins 14, leaving a space between the peripheries 36 of the rolls and the bases 12. The reason for this is that the welding operation necessarily roughens the base portion of the rolls somewhat, as indicated at 37, and inasmuch as th jig must be rigid the roughness of the base portions would cause improper operation of the machine and might cause the tube to become jammed in the jig if the rolls were required to engage the roughened base portions. Further, the engagement of the rolls with the fins, which are somewhat resilient, results in the tube and fins being properly guided and firmly held and yet permits expansion of the tube under heat without causing binding in the jig.

In order to support the ends of the tubes as they are being welded a rigid beam 40 extending on either side of the welding machine may be provided, the outward ends of the beams being supported by pedestal members 42. Carriages 44 and 45, supported by rollers 46, 47, support the opposite ends of the tubes through the medium of connecting devices such as the collars 49 and 50 and associated mandrels 51 and 52 which may be arranged, if desired, to make a fluid tight connection with the tube so that a cooling fluid such as water may be supplied to the interior of the tube through the connection 53 and discharged through the outlet 54. The flow of fluid may be controlled by valves 55 and 56, the arrangement being such that fluid pressure may be applied to the interior of the tube to assist in supporting the tube against the pressure of the electrodes, if desired. As the tube and fins progress through the machine the carriages travel along with the tube on the I-beam 40 and thus support the tube and prevent it from sagging because of its own weight. This structure is particularly important in the production of long lengths of finned tubing but is not necessary with shorter, more rigid tubes. Screw means controlled by handles 57 and 58 are provided for transverse adjustments of the supports, and the jig is also provided with screws for transverse adjustment as indicated at 59 and 60.

In operation, a length of tubing is fed into the machine with two oppositely disposed channel members 11, the channel members being engaged by the fin alignment rolls 30 and the tube being engaged by the tube centering rolls 32 and 32'. When the tube and fins reach the electrode rolls 21 and 22, the current is turned on, being controlled and timed in the desired manner, for example, as specified above. The tube and fins are then progressed through the machine, say from left to right as shown in the drawings by the electrode rolls which are power operated. This operation welds the two oppositely disposed finned members to the tube by a series of spaced welded areas such as those indicated in Fig. 2 to 4.

As the tube is discharged from the machine the welding current is cut off, the tube withdrawn from the jig, another pair of fin members assembled therewith and the tube rotated to bring the pair of finned members which had just been welded to the tube into alignment and engagement with the indexing rolls 34. When this is done the fin alignment rolls will guide the new pair of finned members to be next welded to the tube in their proper position with respect to the fins theretofore welded to the tube. The machine is preferably reversible so that these operations can be carried out on the right-hand side of the machine, assuming that the first welding operation was carried out with the tube moving from left to right as shown in the drawing. Then, when the tubes and fins have been properly fed into the machine, the welding current is turned on and the welding electrodes are driven to progress the tube and assembled fins back through the machine in a direction from right to left, as shown in the drawings, thus welding another pair of finned members to the tube. This sequence of operations is continued until the desired number of pairs of finned members have been welded to the tubes, six pairs being employed in the embodiment shown in the drawing.

In the event the cooling arrangement illustrated in Fig. 5 is employed, the mandrels 51 and 52 should be of sufficient length that the operation of welding the fins to the tube can be completed in both directions without the necessity of disengaging the tube therefrom. When this is done it will only be necessary to give the tube a fraction of a turn within the coupling members in order to index it between the successive passes through the machine.

From the foregoing description of my invention it will be evident that I have provided an efficient and economical finned tube member which is particularly useful in heat exchangers and in which full advantage is taken of the heat transfer capacity of the fins. By my method finned tubes having advantageous characteristics can be produced economically and rapidly. Tubes made according to my method not only are efficient from the standpoint of heat transfer but also have great structural strength and are not liable to failure because of heat shocks. My apparatus is arranged to carry out my method rapidly and expeditiously and to accurately weld fins to tubes, the welding operation being controlled so as to produce welds which will give the proper heat transfer and structural strength characteristics to the completed assembly.

Various changes and modifications in my invention will be apparent to those skilled in the art. It is therefore to be understood that my patent is not limited to the preferred form of my invention described herein and that it is contemplated that changes and modifications within the scope and spirit of my invention may be made by those skilled in the art. Therefore it is to be understood that the description herein is given by way of example and not by way of limitation and that my patent is not limited to the forms described herein or in any manner other than by the appended claims when given the range of equivalents to which my patent may be entitled.

Reference is hereby made to my copending application Serial No. 240,328 filed November 14, 1938, now Patent No. 2,261,136 issued November 4, 1941, (of which the present application is a continuation in part), and to my copending application Serial No. 380,690 filed February 26, 1941, now Patent No. 2,261,137 issued November 4, 1941, both of which relate to heat exchange conductors of the type disclosed in the present application; and reference is also made to my application Serial No. 388,835 filed April 16, 1941, which relates to the method of making finned tubes disclosed in the present application.

I claim:

1. In an apparatus for welding fins on tubes, oppositely disposed electrode rolls adapted to engage channel section fin members disposed equally spaced circumferentially about a tube, guide rolls disposed on both sides of each of said electrode rolls in alignment therewith and positioned to engage within and guide such fin members in alignment with said electrodes and retain said members against the tube in position for welding, an indexing roll positioned to engage within a fin member which has been previously welded to said tube, said indexing roll being circumferentially spaced from said guide rolls and electrode rolls, means for traversing a tube and associated fins through said apparatus, and means for supplying a welding current to said electrode rolls.

2. In an apparatus for welding fins on tubes having a pair of opposed electrode rolls adapted to engage longitudinally extending fin members disposed on opposite sides of a tube, means for traversing a tube and associated fin members through said apparatus, and means for supplying a welding current to said electrode rolls; a pair of guides disposed on opposite sides of each of said electrode rolls and positioned to engage and guide such fin members in alignment with said electrodes and retain said members in position for welding, and an indexing member for engaging a fin member which has been previously welded to said tube, said indexing member being circumferentially spaced from said guides and electrode rolls.

3. In an apparatus for welding fins to tubes, having a pair of opposed electrodes adapted to engage channel section fin members disposed on opposite sides of a tube, means for traversing a tube and associated fin members through said apparatus and means for supplying a welding current to said electrodes; a pair of guides positioned in alignment with the longitudinal axis of the tube and with said electrodes for engaging within and guide such fin members in alignment with said electrodes and retain said members in position for welding, an indexing roll adapted to engage within a fin member which has been previously welded to said tube, said indexing roll being circumferentially spaced from said guide rolls and electrodes, and a pair of tube centering rolls lying in planes generally transverse to the plane of said electrode rolls and adapted to engage directly against the outer surface of a tube passing through the apparatus.

4. In an apparatus for welding fins to tubes, having a pair of opposed electrodes adapted to engage the bases of channel section fin members disposed on opposite sides of a tube, means for traversing a tube and associated fin members through said apparatus and means for supplying a welding current to said electrodes; means for engaging the fins of such fin members, guiding such fin members in alignment with said electrodes and retaining said members in position for welding, indexing means for engaging the fins of a fin member which has been previously welded to said tube to properly position fins to be welded to the tube with respect to fins previously welded to the tube, said indexing means being circumferentially spaced from said guide means and electrodes, and tube centering means for engaging directly the outer surface of a tube to retain the tube in proper position with respect to said electrodes.

5. In an apparatus for welding fins to tubes, a pair of opposed electrode rolls adapted to engage channel section fin members disposed on opposite sides of a tube, pairs of guides disposed on both sides of said electrode rolls and in alignment therewith for engaging within and guiding such fin members in alignment with said electrodes and retain said members in position for welding, an indexing roll for engaging within a fin member which has been previously welded to said tube, said indexing roll being circumferentially spaced from said guide rolls and electrode rolls, a pair of tube centering rolls lying in planes generally transverse to the plane of said electrode rolls for engaging directly the outer surface of a tube, means for traversing a tube and associated fins through said apparatus, and means for supplying an intermittent welding current to said electrode rolls to thereby produce a series of oppositely disposed spaced welded areas between said fin members and said tube.

6. In an apparatus for welding channel section finned members to tubes, a pair of opposed electrode rolls for engaging the bases of said channel section finned members disposed on opposite sides of the tube and means for retaining and holding said channel section members and said tube in proper position with respect to said electrodes comprising a pair of guide rolls, each of said guide rolls having frustro-conical side surfaces for engaging the inner sides of the fin portions of said channel members, the peripheral portion of said rolls being spaced away from the base portion of the finned members when the sides of the rolls are in such engagement with the fin portions, an indexing roll for engaging the fin portions of one of said channel members without engaging the base portion thereof, and tube centering rolls for engaging directly against the outer surface of the tube.

7. An apparatus for welding fins on tubes, having a pair of electrode rolls adapted to engage channel section finned members disposed on opposite sides of the tube, means for traversing a tube and associated fin members through said apparatus and means for supplying a welding current to said electrode rolls; the combination of means rigidly mounted adjacent said electrode rolls for guiding a tube and a pair of channel section fin members through said apparatus in proper relationship with respect to said electrodes, means movable with said tube for supporting the ends thereof as the tube is passed through the apparatus and means associated with said supporting means for supplying a cooling fluid to the interior of the tube.

8. An apparatus for welding fins on tubes having a pair of electrode rolls adapted to engage channel section finned members disposed on opposite sides of the tube, means for traversing a tube and associated fin members through said apparatus and means for supplying a welding current to said electrode rolls; the combination of means rigidly mounted adjacent said electrode rolls for guiding a tube and a pair of channel section fin members through said apparatus in proper relationship with respect to said electrodes and means movable with said tube for supporting the ends thereof as the tube is passed through the apparatus.

9. In an apparatus for progressively welding to a tube a finned member having a base portion and a fin portion integral therewith, an electrode adapted to engage the base portion of said member and weld the same to the tube, and a guide fixedly positioned with respect to the electrode for guiding said member in proper position with respect to said electrode, said guide being shaped to engage the fin portion of said member without engaging the base portion thereof and positioned to engage said member after it has been engaged by said electrode.

10. In an apparatus for welding fins on tubes, oppositely disposed electrode rolls adapted to engage longitudinally extending fin members disposed along the exterior of a tube, guides disposed in alignment with said electrode rolls and positioned to engage and guide such fin members in alignment with said electrodes and said tube and to retain said members against said tube in position for welding, means for urging said electrode rolls toward each other and against said members to press said members against said tube, means adapted to resist any forces applied by said electrodes and tending to displace said tube sideways for preventing sideways movement of said tube with respect to said electrodes, and means for traversing a tube and associated fin members through said apparatus.

11. An apparatus for simultaneously welding a pair of longitudinally extending fin members to the exterior of a tube, comprising a pair of electrode rolls lying in substantially the same plane and spaced apart by said tube and engaging fin members disposed on opposite sides of said tube, means for guiding said tube through said apparatus with the axis thereof lying substantially in the plane of said electrode rolls, means for guiding said fin members in alignment with said electrodes and against said tube, means for traversing said tube and fin members through said apparatus, means for urging said electrodes toward each other to press said fin members against said tube, means adapted to resist any forces applied by said electrodes and tending to displace said tube sideways for preventing sideways movement of said tube with respect to said electrodes, and means for supplying a welding current to said electrodes, said welding current flowing between said electrodes through portions of said fin members adjacent said tube and through the walls of said tube to simultaneously weld said fin members to opposite sides of said tube.

12. In an apparatus for welding fins to tubes, a pair of opposed electrode rolls adapted to engage channel section fin members disposed on opposite sides of a tube, guides disposed on both sides of each of said electrode rolls and in alignment therewith for engaging within and guiding such fin members in alignment with said electrodes and retaining said members in position for welding, a pair of tube centering rolls mounted on axes generally transverse to the axes of said electrode rolls for engaging directly the outer surface of a tube, and means for traversing a tube and associated fins through said apparatus.

JOHN W. BROWN, Jr.